(12) United States Patent
Turin

(10) Patent No.: US 6,226,613 B1
(45) Date of Patent: May 1, 2001

(54) DECODING INPUT SYMBOLS TO INPUT/OUTPUT HIDDEN MARKOFF MODELS

(75) Inventor: William Turin, East Brunswick, NJ (US)

(73) Assignee: AT&T Corporation, New York, NY (US)

(*) Notice: Subject to any disclaimer, the term of this patent is extended or adjusted under 35 U.S.C. 154(b) by 0 days.

(21) Appl. No.: 09/183,474

(22) Filed: Oct. 30, 1998

(51) Int. Cl.$^7$ .................................................. G10L 15/14
(52) U.S. Cl. ............................................ 704/256; 704/255
(58) Field of Search ..................................... 704/256, 255

(56) References Cited

PUBLICATIONS

William Turin, "The Forward–Backward Algorithm—Work Project No. 311614–2003", Technical Memorandum, AT&T, Nov. 1997.*
William Turin, "MAP Decoding using the EM Algorithm," Proc. IEEE 49th Vehicular Technology Conference, vol. 3, p. 1866–1870, May 1999.*
William Turin and Michele Zorzi, "Performance of Delay-Constrained Communications over Diverse Burst–Error Channels," Proc. IEEE 50th Vehicular Technology Conference, vol. 3, p. 1305–1309, Sep. 1999.*
William Turn, "MAP Decoding in Channels with Memory," IEEE Trans. on Communications, vol. 48, No. 5, p. 757–763, May 2000.*

* cited by examiner

*Primary Examiner*—Tãlivaldis I. Šmits
(74) *Attorney, Agent, or Firm*—Oliff & Berridge, PLC

(57) ABSTRACT

The invention provides an information decoding system which takes advantage of the finite duration of channel memory and other distortions to permit efficient decoding of hidden Markov modeled information while storing only a subset of matrices used by the previous art. The invention may be applied to the maximum a posteriori (MAP) estimation of the input symbols of an input-output hidden Markov model, which can be described by the input-output transition probability density matrices or, alternatively, by finite-state systems. The invention is also applied to MAP decoding of information transmitted over channels with bursts of errors, to handwriting and speech recognition and other probabilistic systems as well.

20 Claims, 6 Drawing Sheets

DECODING INPUT SYMBOLS TO INPUT/OUTPUT HIDDEN MARKOFF MODELS

BACKGROUND OF THE INVENTION

1. Field of Invention

The invention relates to a method and apparatus for computation of products of a vector and a sequence of matrices.

2. Description of Related Art

Vector matrix products occur often in applications such as speech recognition, signature verification, error correction code decoding, etc. Techniques such as the forward-backward-algorithm (FBA) are commonly used for such applications. However, equipment that performs these algorithms requires large amounts of memory for storing all the matrices and intermediate matrix products needed to support these algorithms.

For example, when Hidden Markov Models (HMM) are applied to describe a communication channel, products of sequences of probability density matrices are needed to estimate the a posteriori probabilities of transmitted symbols given the received symbols. The FBA requires that the sequence of matrices multiplied by the first vector in a recursive manner in the forward part of the algorithm to be stored in memory and the decoding process can start only after a long sequence of symbols has been received. This is intolerable in many applications (a telephone application, for example) which impose strict constraints on the message delivery delay. Thus, new technology is needed to improve the vector-matrix product calculation which enables a decoder to estimate the product without waiting for the whole sequence to be received. This technology enables a designer to trade the product estimation accuracy for smaller delays in information delivery.

SUMMARY OF THE INVENTION

The invention provides a method and apparatus that performs a fixed-lag computation process. Instead of storing all the forward vectors in memory, a sequence of partial matrix products is computed and stored in memory. A first vector is multiplied by the sequence of matrices recursively to generate the forward vector as in the standard FBA, but without saving the results in memory, because the algorithm does not have a backward part. Then the sequence of the partial matrix products is recursively updated by multiplying then by the next matrix in the sequence. The backward vector is estimated as a product of the updated partial product by the second vector to estimate the backward vector. And, finally, the updated forward and backward vectors are multiplied to obtain the desired result.

Thus, the fixed-lag process of the invention by estimating the backward vectors recursively in the forward fashion replaces the FBA by the forward-only algorithm which eliminates the need of saving the forward vectors. The price paid for this is saving and updating in memory the partial matrix products. Accordingly, memory requirements and decoding delay are reduced when using the fixed-lag process to decode communication channel messages, for example.

Further memory reduction may be achieved if matrix inversion is applied. For this case, only one partial matrix product must be saved in memory. Thus, additional memory savings may be achieved by expending computational resources to invert matrices.

BRIEF DESCRIPTION OF THE DRAWINGS

The invention will be described with reference to the accompanying drawings in which like elements are referenced with like numerals and in which.

DETAILED DESCRIPTION OF PREFERRED EMBODIMENTS

As described herein, the invention provides a method and apparatus to generate estimates for processing input data symbols, using sequences of matrices. The matrices in general reflect the relationship between a system state variables, input and output sequences. For example, the matrices may describe an HMM of a communication system representing the probabilities $\Pr(X_t, Y_t, S_t|S_{t-1})$ of transitioning from state $S_{t-1}$ to the next state $S_t$ and generating the next input symbol $X_t$ and output symbol $Y_t$. Those communication channels could be wireless radio links, fiber optical channels, or others. Many other systems can be analyzed using state matrix information. For instance, bioelectrical signals such as EKGs, seismic measurements, handwriting recognition devices, speech recognition devices, control systems and others can be modeled as machines or processes whose next state depends upon the current state, plus input information or symbols. All these systems can be described in terms of communications systems. For example, in speech recognition the output sequence is what we hear, while the input is the corresponding meaning. In handwriting recognition, the output is the sequence of scanned handwritten symbols, while the input is the intended sequence of letters which a decoder must recognize. Therefore, in the sequel we will use the communication system terminology, but the results have a broader application.

A typical representation of an information process of this general type requires generation of a value p that is a product of matrices:

$$p_t = \alpha_0 \prod_{i=1}^{t-1} M_i W_t \prod_{i=t+1}^{T} M_i \beta_T = \alpha_{t-1} W_t \beta_t \tag{1}$$

where $\alpha_0$ is a row vector, $\beta_T$ is a column vector and $M_i$ are square matrices.

The evaluation of the parameter $p_t$ according to the equation above is conventionally done by the Forward-Backward Algorithm (FBA). The FBA requires that the decoding unit must receive all symbols in an input sequence, compute and store the forward vectors $$\alpha_t = \alpha_0 \prod_{i=1}^{t} M_i \text{ for all } t = 1, 2, \ldots, T \tag{2}$$

then compute the backward vectors $$\beta_t = \prod_{i=t+1}^{T} M_i \beta_T \qquad (3)$$

and, finally compute $p_t = \alpha_{t-1} W_t \beta_t$ for all $t = T-1, T-2, \ldots, 1$. This places large demands on memory and processing resources.

The invention avoids the necessity of storing the complete symbol sequence and reduces processing time compared to conventional technology. The invention does so in part by observing that a sufficient estimate $p_t$ of may be made, if the application exhibits a fading or finite memory so that the tail portion of the product shown in Equation 1 may be ignored with little penalty in accuracy.

Figure 1:
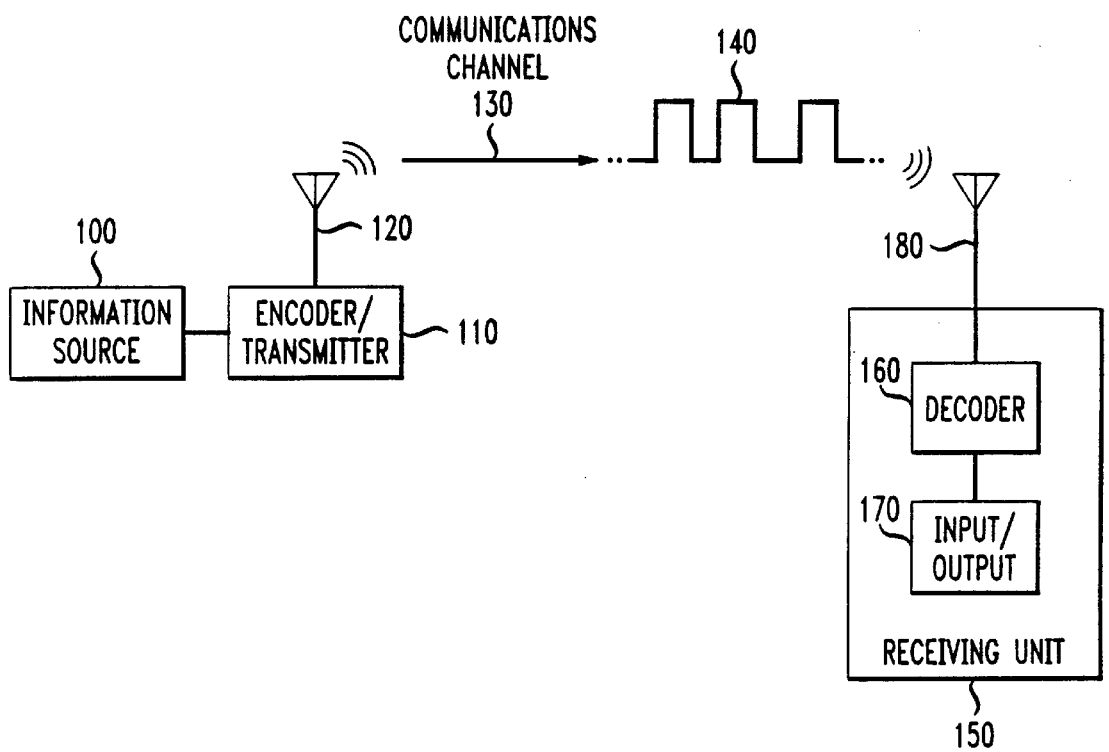
FIG. 1 illustrates information processing according to the invention over a wireless communication channel.

FIG. 1 shows an exemplary communications system 10 as a typical application of the estimate process according to the invention. In FIG. 1, an information source 100 outputs information signals to an encoder/transmitter 110, such as a base station in a wireless cellular communications system. Encoder/transmitter 110 transmits an encoded signal from antenna 120 over a communication channel 130, which may, for instance, be the radio frequency channels according to Personal Communications Service (PCS) or other forms of wireless communications. The transmitted symbols 140 are received at a receiving unit 150, which may be a mobile cellular telephone, over an antenna 180. The receiving unit 150 receives the transmitted symbols 140 and processes them in a decoder 160 to provide decoded output symbols via an input/output unit 170. The input/output unit 170 may for instance output voice sounds in a cellular telephone.

Real communication channels are characterized by the bursty nature of errors which can be modeled quite accurately by the Hidden Markov Models (HMMs) as known in the art. Therefore, the communications system 10 may be modeled by an HMM, and the transmitted symbols 140 may be decoded by known methods such as maximum a posteriori (MAP) symbol estimation as discussed in the appendix on pages 8–10. In particular, an FBA process may be applied which evaluates a probability at time t, $P(X_t | Y_1^T)$, for the transmitted symbol to be $X_t$ for actually received symbols $Y_1^T = Y_1, Y_2, \ldots, Y_T$ where $P(X_t | Y_t^T)$ is proportional to $$P(X_t, Y_1^T) = \alpha_{t-1} P(X_t, Y_t) \beta_t$$

where $\alpha_0$ is the vector of the Markov chain state initial probabilities, $\alpha_t$ and $\beta_t$ are computed according to equations (2) and (3) in which $M_i = P(Y_i)$ represent the matrix probabilities of receiving symbols $Y_i$. However, channel distortions affecting the transmitted information symbols 140 only persist for a finite period of time, for instance due to multipath fading. Thus, it is only necessary to look forward by a fixed period of time or time lag $\tau$ through the received sequence to decode the received symbols to generate the decoded output symbols.

If the memory in the communication channel is of length $\tau$, then probability $P(X_t | Y_1^T)$ at time t of a transmitted symbol $X_t$, given the received sequence may be estimated by the expression:

$$p_t \approx \alpha_0 \prod_{i=1}^{t-1} M_i W_t \prod_{i=t+1}^{t+\tau} M_i \beta_\infty = \alpha_{t-1} W_t \beta_{t,\tau}$$

where $W_t = P(X_t, Y_t)$ is the matrix probability of transmitting $X_t$ and receiving $Y_t$. When compared with the conventional FBA, at a given time t, only the terms extending from 1 to t+τ are computed instead of 1 to T, where T is the total time period of the complete received symbols. Thus, the terms extending from t+τ to T are eliminated when computing the estimate. The invention presents the algorithm for computing vectors $$\beta_{t,\tau} = \prod_{i=t+1}^{t+\tau} M_i \beta_\infty = M_{t+1}^{t+\tau} \beta_\infty \qquad (4)$$

recursively, thus saving both the memory space and processing time required to support computation of $p_t$.

The invention makes use of the fact that the matrices $$M_{t+1}^{t+\tau} = \prod_{i=t+1}^{t+\tau} M_i$$

can be computed recursively by the following equation $$M_{t+k+1}^{t+\tau+1} = M_{t+k+1}^{t+\tau} M_{t+\tau+1}, k = 1, 2, \ldots, \tau \qquad (5)$$

and then compute $$\beta_{t+1} = M_{t+2}^{t+\tau+1} \beta_\infty.$$

The vector $\beta_\infty = 1$ in most applications is a vector whose all elements are ones.

Figure 2:
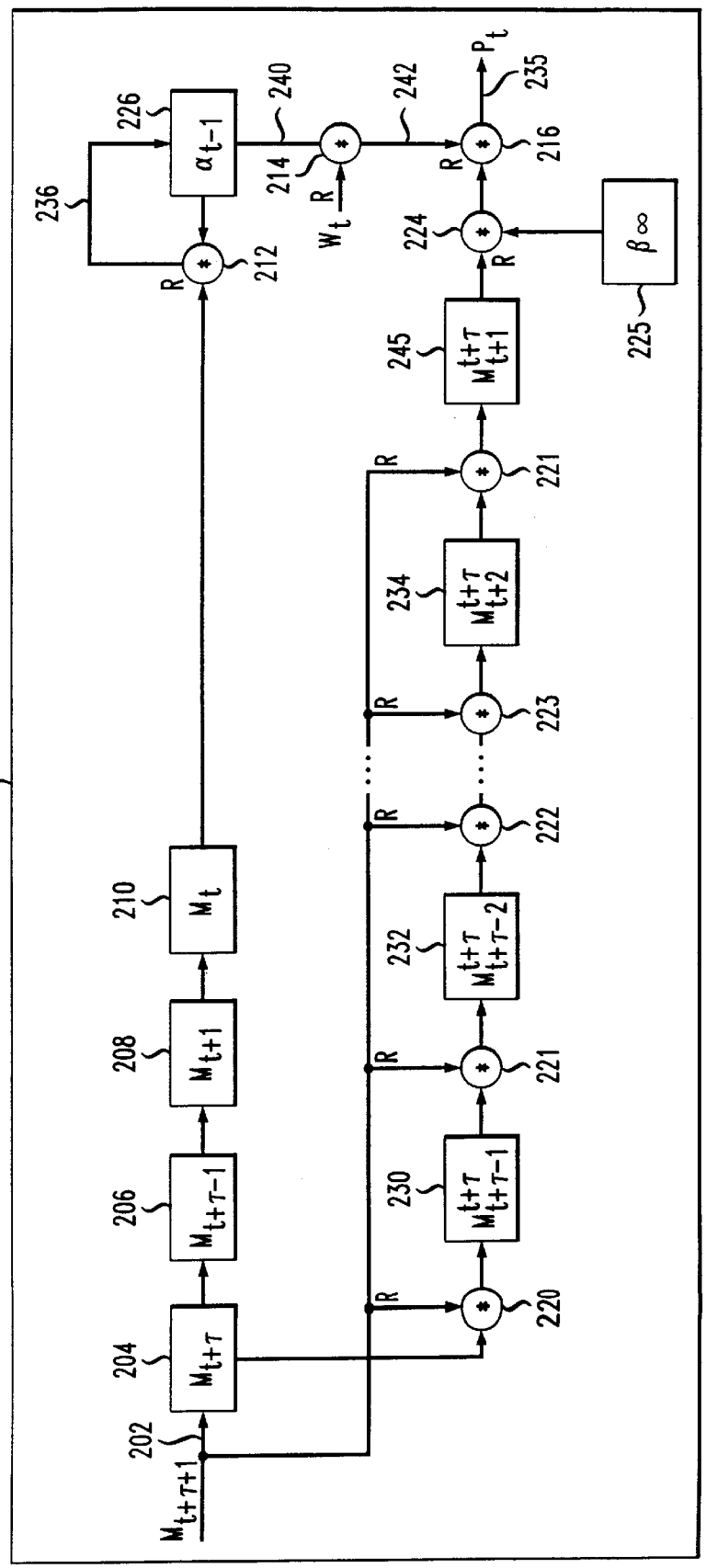
FIG. 2 illustrates a decoder used to decode symbols transmitted according to FIG. 1.

FIG. 2 shows a flow diagram of a general process for generating the estimate $p_t$. In this figure, letter "R" on signal lines indicates that the corresponding matrix multiplies the matrix on the other line from the right. It is important to show, because matrix products are not commutative. As illustrated in FIG. 2, $M_{t+\tau+1}$ is input on signal line 202, and then multiplied by a series of matrices: $M_{t+\tau}$ stored in storage element 204, $M_{t+\tau+1}$ stored in storage element 206, ..., $M_{t+1}$ stored in storage element 208, and $M_t$ stored in storage element 210. $\alpha_{t-1}$ stored in storage element 226 is then right-multiplied by multiplier 210 and the result is output over signal line 236 to update $\alpha_{t-1}$ to $\alpha_t$. $\alpha_t$ is output over signal line 240 for right multiplication by $W_t$ by multiplier 214. The result of the multiplier 214 is output over signal line 242 to multiplier 216 as a forward portion of the estimate $p_t$. The storage elements 204, 206, . . . , 208, and 210 serve to delay the matrices $M_t \to M_{t+\tau}$ to synchronize the generation of the forward pattern with the generation of a backward portion as described below. The partial matrix product $$M_{t+1}^{t+\tau}$$

stored in the storage element 235 is then right multiplied by the vector $\beta_\infty$ stored in the storage element 228 and the result is multiplied from the left by the forward portion obtained on line 242 thus producing the desired estimate $p_t$. The partial matrix products stored in the storage elements 230, 232, . . . , 235 may be generated in a progressive manner according to equation (5) by storing a sequence of τ–1 matrix products where each member of the sequence is generated by matrix multiplying a prior member of the sequence by $M_{t+\tau+1}$ from the right and storing the result in a storage element of the next sequence member.

As shown in FIG. 2, storage elements 230, 232, . . . , 234 and 235 store the sequence of matrix products. When $M_{t+\tau+1}$ is generated, 1) the content of the storage element 235 is matrix multiplied with $\beta_\infty$ by multiplier 225 to generate the next backward portion, 2) the storage element 235 is then used to store the result of the matrix product between the content of the storage element 234 and $M_{t+\tau+1}$ generated by multiplier 224, 3) the storage element 234 is then used to store the matrix product between the content of the next storage element earlier in the sequence and $M_{t+\tau+1}$ generated by the multiplier 222 and so on. After the content of the storage element 232 is used to generate the matrix products for the following storage element in the sequence, it is used to store the output of multiplier 221. Finally, the storage element 230 stores the product $M_{t+\tau}M_{t+\tau+1}$. Thus, the storage elements 230, 232, 234 and 235 stores $\tau-1$ sequence of matrix products for generating the backward portion of the $p_t$. The backward portion is multiplied by multiplier 216 with the forward portion to generate $p_t$ as the probability at time t.

In the alternative implementation of the algorithm, we assume that it is possible to calculate the inverse matrices $M_t^{-1}$. In this case, the partial matrix products can be evaluated according to the following equation $$M_{t+2}^{t+\tau+1} = M_{t+1}^{-1} M_{t+1}^{t+\tau} M_{t+\tau+1} \tag{6}$$

Therefore, the whole sequence of storage elements and multipliers 230 through 235 in FIG. 2 may be replaced with a single storage device, two multipliers and the matrix inversion unit. The latter may be replaced with storage units if the inverse matrices are precomputed and saved before. This embodiment is described below more particularly with respect to FIG. 7.

Figure 3:
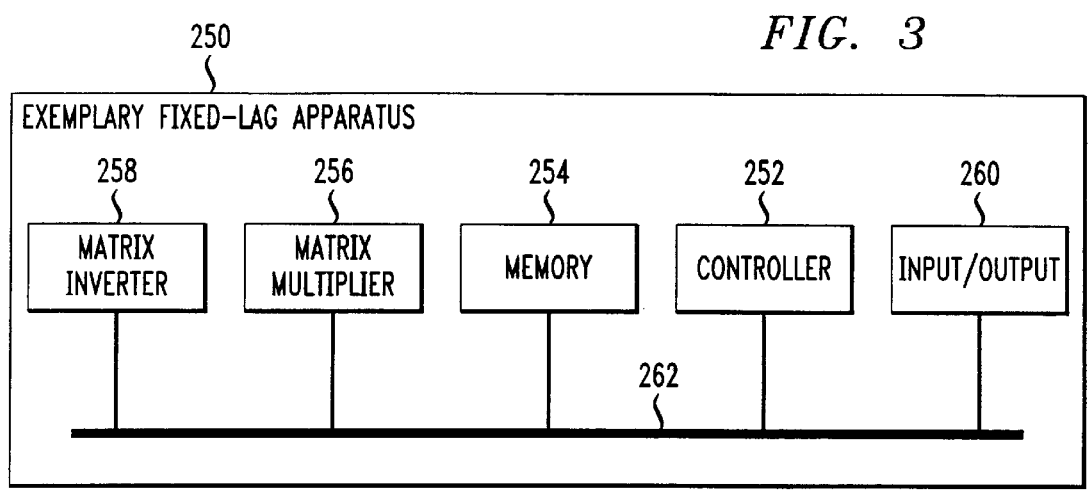
FIG. 3 illustrates a decoder in another aspect.

The generation of $p_t$ according to FIG. 2 can be implemented by an exemplary fixed-lag apparatus 250 shown in FIG. 3. The fixed-lag apparatus may include a controller 252, a memory 254, a matrix multiplier 256, a matrix inverter 258 and an input/output device 260. The above components are coupled together via signal bus 262.

While the fixed-lag apparatus 250 is shown with a common bus architecture, other structures are well known to one of ordinary skill in the art. In addition, the functions performed by each of the devices could be performed by a general purpose computer, digital signal processors, application specific integrated circuits, DGA's, DLA, etc. which are well known in the art.

When generating $p_t$, the controller 252 reads values of the matrices $M_i$ out of memory 254 for multiplication by matrix multiplier 256 or inversion by matrix inverter 258. The individual matrices $M_t M_{t+\tau}$ are stored in memory 254, which may be electronic random access memory or other forms of electronic or other storage appreciated by persons skilled in the art. Memory 254 likewise contains the matrix products of storage elements 234–235 which are $M_{t+\tau-1}M_{t+\tau}, M_{t+\tau-1}M_{t+\tau-2}M_{t+\tau-3}, \ldots, M_{t+1}M_{t+2}\ldots M_{t+\tau}$.

At each time t, the controller 252 generates the matrix $M_{t+\tau+1}$. This matrix may be generated based on the HMM of the underlying process and received sequence of symbols for the period T (e.g., received encoded data over a communication channel or a handwriting analysis process). Once generated, $M_{t+\tau+1}$ is stored in the memory 254 and used for the fixed-lag operation as described below.

The controller 252 directs matrix multiplier 256 to generate $\alpha_t$ by multiplying $\alpha_{t-1}$ stored in storage element 226 by $M_t$, further directing the matrix multiplier 256 to multiply $\alpha_t$ by $W_t$ to generate the forward portion. The controller 252 generates the backward portion by directing the matrix multiplier 256 to multiply $\beta_\infty$ stored in the storage element 228 with $$M_{t+1}^{t+\tau}$$

stored in storage element 235. The controller 252 then generates $p_\tau$ by directing the matrix multiplier 256 to multiply the forward portion with the backward portion and outputs $p_t$ to further downstream processes.

After generating the backward portion, the controller 252 proceeds to generate each of the matrix products to be stored in the storage element 230, 232, 234 and 235 by directing the matrix multiplier 256 to multiply $M_{t+\tau+1}$ with the contents of each respective storage element and storing the result in the next following storage element in the sequence. In this way, all the contents of the storage elements 230, 232, 234 and 235 are prepared for the generation of $p_{t+1}$.

Figure 4:
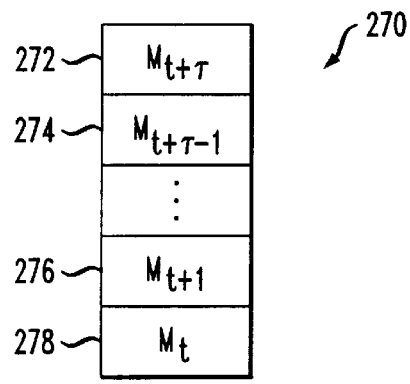
FIG. 4 illustrates a matrix storage according to the invention.

FIG. 4 shows a FIFO 270 as an exemplary device for the storage elements 204, 206, 208 and 210. The FIFO 270 has $\tau+1$ locations 272, 274, 276 and 278 that correspond to the storage elements 204, 206, 208 and 210, respectively.

For each t, $M_t$ is read from the FIFO 270 and a $M_{t+\tau+1}$ is generated and "pushed" into the FIFO 270. For example, at time t=1, the FIFO 270 contains $M_{t+\tau}$ in location 278, $M_\tau$ in location 274, $M_2$ in location 276 and $M_1$ in location 278. At t=2, the FIFO 270 contains $M_{2+\tau}$ in location 278, $M_{\tau+1}$ in location 274, $M_3$ in location 276 and $M_2$ in location 278. $M_1$ is consumed by vector matrix multiplication with $\alpha_0$ to for $\alpha_1$ now stored in storage element 226.

Figure 5:
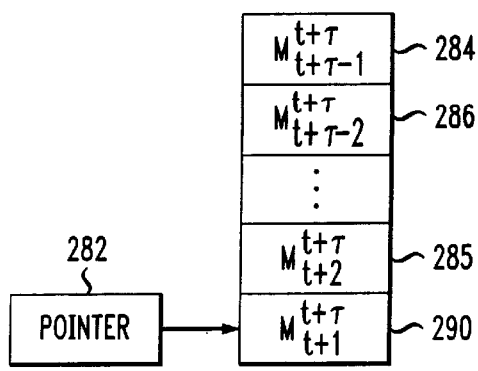
FIG. 5 illustrates a matrix storage according to the invention in another aspect.

FIG. 5 shows an exemplary memory management scheme of a memory space 280 for storage elements 230, 232, 234 and 235. A block of locations 284, 286, 288 and 290 in the memory 254 may be set aside corresponding to the storage elements 230, 232, 234 and 235. Thus, at t=1, location 284 contains $M_\tau M_{1+\tau}$, location 286 contains $M_{\tau-1}M_\tau M_{1+\tau}$, location 288 contains $M_3 M_4 \ldots M_{1+\tau}$, and location 290 contains $M_2 M_3 \ldots M_{1+\tau}$. The pointer 282 is pointing at location 290 in preparation for generating the backward portion of $p_1$. At t=2 the controller 252 reads the contents of the location pointed to by the pointer 282 and obtains $M_2 M_3 \ldots M_{1+\tau}$ and sends this matrix product to the matrix multiplier 256 to generate the first backward portion $M_2^{1+\tau}\beta_\infty$. Then the controller 252 directs the matrix multiplier 256 to multiply $M_{1+\tau}$ with $M_{2+\tau}$ and stores the product in the location pointed to by the pointer 256 which is location 290 thus overwriting $M_2 M_3 \ldots M_{1+\tau}$. The controller 252 then updates the pointer 256 to point to location 288 by decrementing the pointer 256 by M, for example, where M is the number of elements in each of the matrix product. In this regard, each of the locations 284, 286, 288 and 290 actually is a block of memory space sufficient to store one of the matrix products.

Then, the controller 252 directs the matrix multiplier 256 to matrix multiply the contents of each of the remaining locations 284, 286 and 288 with $M_{2+\tau}$. At this point, the memory space 280 is ready for the next cycle to generate the backward portion for $p_{t+1}$.

After $\tau-2$ cycles, the pointer 282 would be pointing to location 284. During the $\tau-1$ cycle the pointer 256 would be incremented by $\tau-2$ to again point to location 290 which essentially permits the memory space 280 to be a circular buffer of $\tau-1$ locations 284, 286, 288 and 290.

Figure 6:
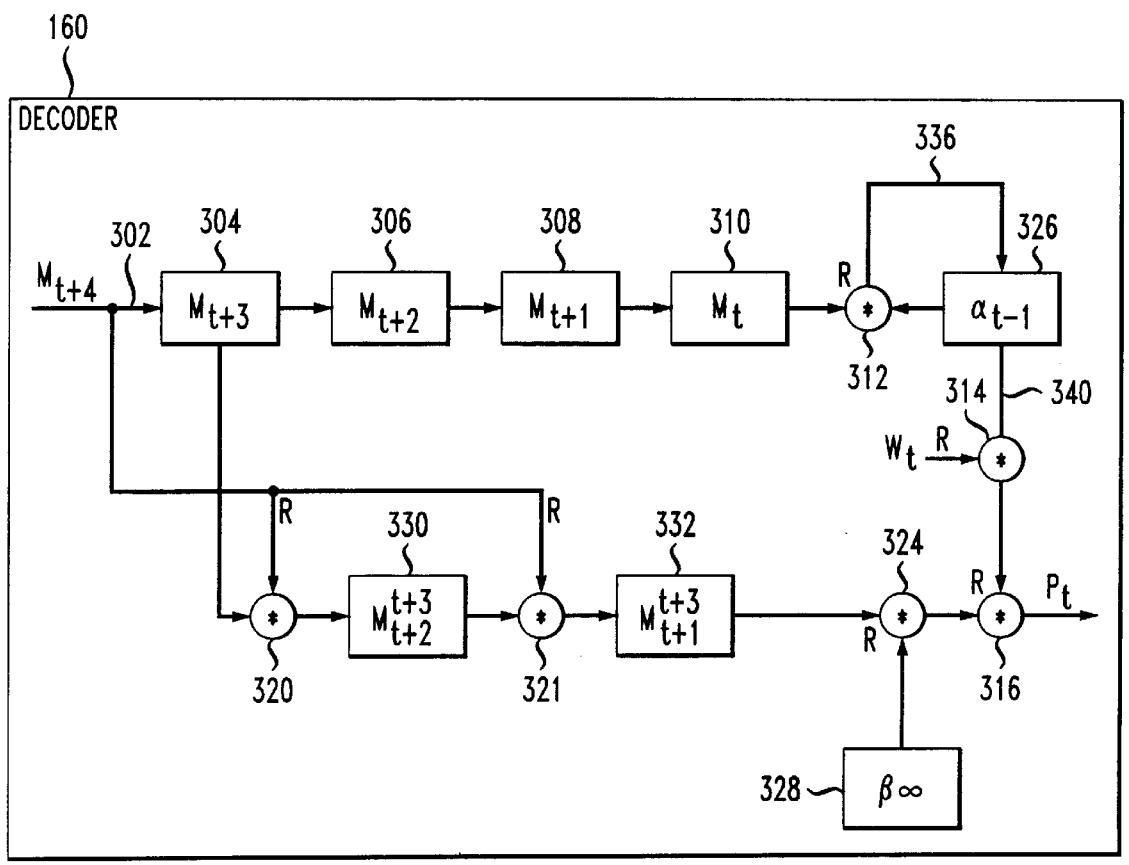
FIG. 6 illustrates a fixed-lag decoding apparatus for 3 memory elements according to the invention.

FIG. 6 shows a specific example of decoding according to the invention where $\tau$ is set equal to 3 and T=256. As illustrated in FIG. 6, the calculations are initialized using $\alpha_{t-}$ and $$M_{t+1}^{t+3}$$

to generate $p_t$. Matrix $M_{t+4}$ is then input over signal line 302 to a sequence of matrices $M_{t+3}$, $M_{t+2}$, $M_{t+1}$, and $M_t$ stored in storage elements 304, 306, 308 and 310, respectively, right-multiply the $M_t$ in storage element 302 by multiplier 312 with $\alpha_{t-1}$ (of storage element 326) thus generating $\alpha_t$. The forward portion is generated by $\alpha_t$ is output over signal line 336 to store $\alpha_t$ into storage element 326, thus updating $\alpha_{t-1}$ to $\alpha_t$. Simultaneously, $\alpha_{t-1}$ is output over signal line 340 to right-multiplier 314 for right-multiplication by $W_t$, that product in turn being output to multiplier 316. Multiplier 320 receives $$M_{t+1}^{t+3}$$

stored in storage 332 and right-multiplies it by $\beta_\infty$ stored in storage 328 and then output to multiplier 316 which multiplies it from the left by the quantity $\alpha_{t-1}W_t$ and outputs over signal line 338 the desired result $$p_t = \alpha_{t-1}W_t M_{t+1}^{t+3}\beta_\infty.$$

In the mean time, the contents of the storage elements 330 and 332 are replaced by $$M_{t+3}^{t+4} = M_{t+3}M_{t+4} \text{ and } M_{t+2}^{t+4} = M_{t+2}M_{t+3}M_{t+4},$$

respectively. The storage elements 304, 306, 308 and 310 are also updated by shifting their contents thus preparing for the next cycle.

In decoder 160, the received value $p_t$ which is used to decode the current transmitted symbol. The following illustrates the calculation of several initial values of $P_t$.

$$p_1 = \alpha_0 W_1 M_2 M_3 M_4 \beta_\infty,$$

$\alpha_1 = \alpha_0 M_1$,
$M_4^5 = M_4 M_5$,
$M_3^5 = M_3 M_4 M_5$ $$p_2 = \alpha_1 W_2 M_3^5 \beta_\infty,$$

$\alpha_2 = \alpha_1 M_2$,
$M_5^6 = M_5 M_6$,
$M_4^6 = M_4 M_5 M_6$, and so on.

As can be seen from FIG. 2 and Appendix equation 6, in the invention the conventional products of Markov matrices are truncated according to the persistence of memory in communications channel 130, reducing storage and computation significantly.

The effects of memory on communications channel 130 are accounted for by the product of matrices $M_t$_$M_{t+3}$. Therefore, decoder 160 as illustrated in FIG. 2 outputs to input/output unit 170 a probability value $p_t$ that a symbol $X_t$ was transmitted at time t. In the illustrative embodiment, the encoder/transmitter 110 may be transmitting wireless voice or data signals over communications channel 130, and input/output unit 170 may output a voice output over receiving unit 150, such as a voice sound.

The general form of the equation for calculating the partial matrix products according to the invention is shown in Equation 6 in the Appendix, for arbitrary τ. As can be seen from that expression, in the invention it is only necessary to compute matrix products of matrices modeling the communication channel, whether wireless, radio frequency, optical or otherwise, over the period of time τ representing channel memory.

The transmitted information symbols 140 are illustrated in FIG. 1 as being cellular wireless voice or data symbols, however, it will be understood that the invention can be applied to any information signals that can be modeled by an HMM. Such information signals could also be, for instance, voice recognition information, handwriting information, bioelectrical signals such as electrocardiographs, seismic signals, and others. In a handwriting implementation, for instance, each letter would represent an information symbol which is modeled by an HMM, whose states are composed of preceding and succeeding letters and some hidden states representing a particular style of writing, for example, which would be reflected in matrices drawn to that model.

The system and method of the invention according to the foregoing description achieves information decoding in a streamlined manner. Using the invention, it is possible among other things to avoid having to store all forward (as well as backward) vectors in an HMM, and moreover to look forward through the chain by only a fixed lag, rather than through the entire sequence. This reflects the realization that time delays or fades which create a memory effect and distort a channel are of finite duration. Those distortions could only influence the present information signal as long as those time delays, fades or other distortions are still propagated. The invention capitalizes on these and other characteristics of non-Gaussian channels to achieve improved processing efficiency, while placing much reduced demands on processor bandwidth and storage capacity. Further efficiencies are gained when coefficients are recovered using an inverse matrix as described above.

Figure 7:
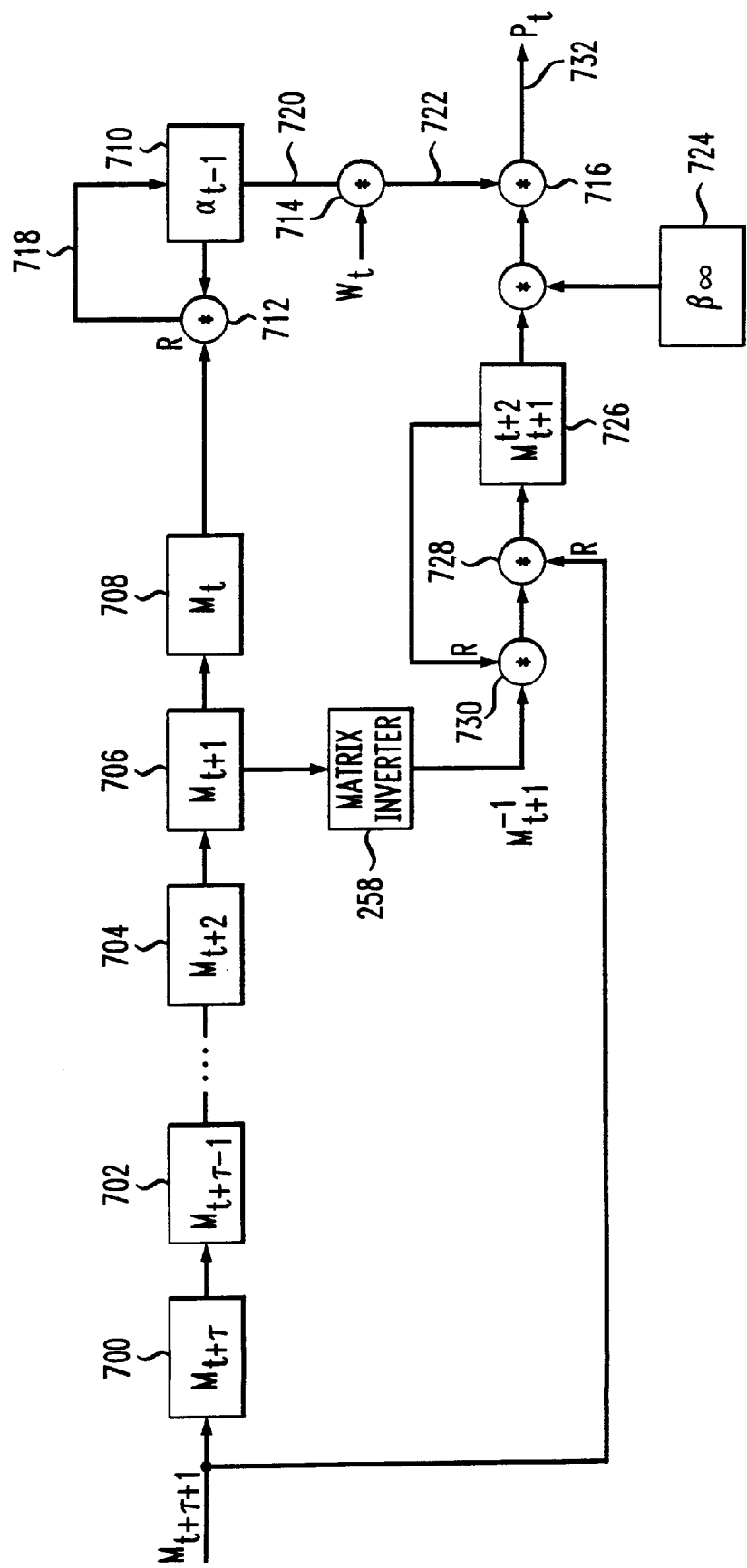
FIG. 7 illustrates a fixed-lag decoding apparatus according to another embodiment of the invention in which matrix inversion is used.

An embodiment of the invention is illustrated in FIG. 7, in which advantage is taken of the property of matrix inversion to realize storage gains in the backward portion of the algorithm. Specifically, when dealing with products of matrices necessary to compute backward portion, it is possible to avoid the chain multiplication over the complete time period t to t+τ, when the intermediate matrix can be inverted. In this embodiment, the matrices for the forward portion of the algorithm are stored similarly to the apparatus of FIG. 2, with $M_t$ being stored in storage element 708, $M_{t+1}$ being stored in storage element 706, and so forth with the last $M_{t+\tau}$ being stored in storage element 700. $M_t$ is multiplied by $\alpha_{t-1}$ stored in storage element 710 by multiplier 712 and the result is stored in storage element 710 thus generating the forward portion $\alpha_t$. Simultaneously, $\alpha_{t-1}$ is sent over signal line 720 for multiplication by $W_t$ and that result is then multiplied by multiplier 716 by the product of $$M_{t+1}^{t+\tau}$$

stored in storage element 726 and $\beta_\infty$ stored in storage element 724 to crate $p_t$, generally as in the other described embodiment.

However, and according to equation (6), to update the value of $\beta_t$ at time t+1, in the case of invertible matrices, storing the entire backward potion is not necessary.

$$M_{t+2}^{t+\tau+1}$$

can be generated by inverting $M_{t+1}$ in the matrix inverter 258, and multiplying $$M_{t+1}^{t+\tau}$$

by that inverted matrix in multiplier 730 to generate $$M_{t+2}^{t+\tau}$$

and then multiplying $$M_{t+2}^{t+\tau}$$

by $M_{t+\tau 1}$ in multiplier 728 to generate $$M_{t+2}^{t+\tau+1}.$$

This has the effect of removing the earliest term from the matrix product, while adding the next multiplicative term at time t+τ+1. Because all of the new matrix products, except for the last term, are dropped and the new value replaces the old one in storage element 726, no more of the backward sequence need to be saved in order to update $β_t$.

Figure 8:
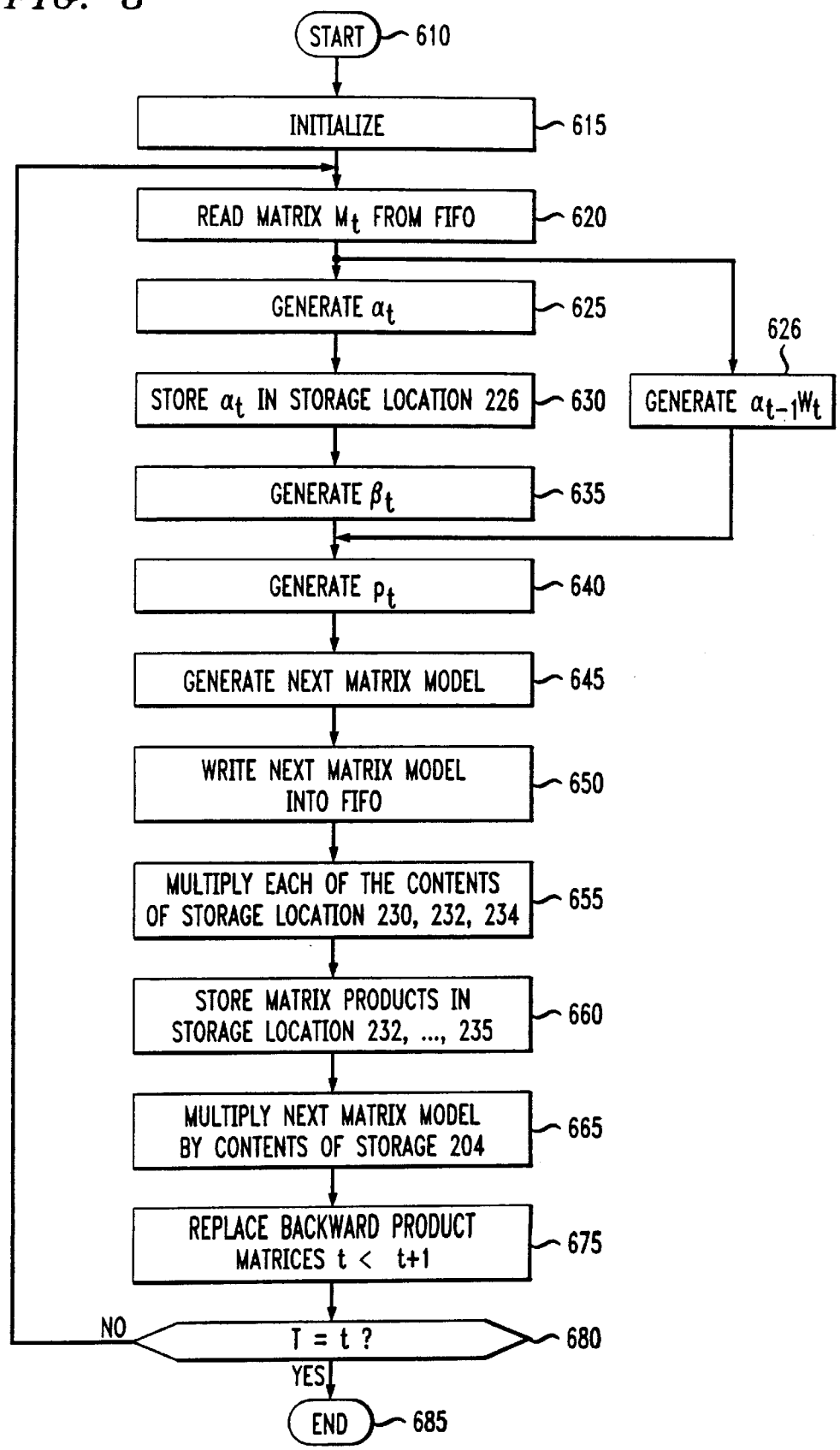
FIG. 8 illustrates a flowchart according to the invention.

The decoding operation is illustrated in another aspect in the flowchart of FIG. 8. It will be understood that the following processing steps are illustrated as executed by controller 252 in coordination with memory 254, matrix multiplier 256 and related elements. Processing begins in step 610, followed by initialization in step 615 of the matrices and parameters as described herein. In step 620, the current matrix is read from the FIFO, and in 625 that quantity is used to generate the current forward portion, $α_t$. In step 626 $α_{t-1}W_t$ is generated. In step 630, $α_t$ is stored in storage location 226. In step 635, $β_t$ is generated. In step 640 $p_t$ representing the a posteriori probability of the input symbol is generated by multiplying $α_{t-1}W_t$ and $β_t$. In step 645, the controller 252 directs the generation of the next matrix model for the following time period. In step 650, the next matrix model is written into the FIFO. In step 655, the next matrix model is multiplied by the contents of each of the storage locations 230, 232, . . . , 234. In step 660, the results of those multiplications are stored in locations 232, . . . , 235. The next matrix model is then overwritten in storage location 204 in step 665, and in step 675 the matrix values for succeeding storage elements 206, 208, . . . , 210 are replaced with the matrix contents for the next time. In step 680, the processing tests whether time has reached the end of the time period T. If not, processing repeats for t+1, otherwise it ends in step 685.

The foregoing description of the system and method for processing information according to the invention is illustrative, and variations in configuration and implementation will occur to person skilled in the art. The scope of the invention is accordingly intended to be limited only by the following claims.

What is claimed is:

1. A fixed-lag method for generating output information symbols based on T number of input symbols that extend through T number of time periods and a plurality of matrices, each one of the time periods corresponding to one of the input symbols and one of the plurality of matrices, the method comprising:

generating intermediate results, where each of the intermediate results is generated by:

storing a first number of the matrices, the first number being equal to τ+1 where τ is a memory length and τ is less than T; and storing a second number of matrix products, the second number being less than τ−1;

selecting τ for an optimum intermediate result; and outputting information probabilities of the output symbols based on the optimum intermediate result.

2. The fixed-lag method of claim 1, further comprising:

generating a first term of each of the intermediate results based on a first matrix of the first number of matrices;

generating a second term of each of the intermediate results based on a first product of the second number of matrix products; and generating each of the intermediate results by matrix multiplying the first term and the second term.

3. The fixed-lag method of claim 1, wherein the first number of matrices is ordered in a time sequence, the first matrix of the first number of matrices corresponds to an earliest time period of the first number of matrices, the method further comprising:

generating a next first number of matrices by shifting the sequence of the first number of matrices by one for each of the time periods so that a second matrix becomes the first matrix and a third matrix becomes the second matrix and so on until a new matrix becomes a last matrix of the first number of matrices.

4. The fixed-lag method of claim 3, wherein the second number is equal to one and the first product is the only product of the second number of matrix products, the method further comprising:

matrix inverting the first matrix of the next first number of matrices to generate an inverted matrix; and matrix multiplying the inverted matrix, the first product, and the new matrix to generate a next first product.

5. The fixed-lag method of claim 3, wherein the first number of matrices is stored in a FIFO, each location of the FIFO storing one of the matrices, the new matrix is stored as an input to the FIFO and an next output of the FIFO being the first matrix.

6. The fixed-lag method of claim 3, wherein the second number of matrix products is ordered in the time sequence, the first product of the second number of matrix products corresponds to an earliest time period of the second number of matrix products, the method further comprising:

generating a next second number of matrix products by:

replacing each of the first product through a next to last product, respectively, with each of a second product through a last product matrix multiplied by the new matrix; and replacing a last product by matrix multiplying the last matrix of the first number of matrices with the new matrix.

7. The fixed-lag method of claim 6, wherein the second number of matrix products is stored in contiguous order from the first product to the last product in a memory space having a pointer pointing to the first product in the memory space, each location of the memory space storing one of the second number of matrix products, contents of each location of the memory space being replaced by the contents matrix multiplied by the new matrix, the first product being replaced by a product of the new matrix, and the last matrix of the first number of matrices to generate the next second number of matrix products.

8. The fixed-lag method of claim 1, wherein the input symbols are at least one of symbols received over a communication channel, handwriting symbols in handwriting recognition, voice print features in voice recognition, and bioelectrical signals grouped in to symbol units.

9. The fixed-lag method of claim 8, wherein the plurality of matrices model processes including communication over channels, handwriting recognition, voice recognition and bioelectrical signal recognition, the matrices being generated based on modeling techniques including Hidden Markov Models.

10. The method of claim 1, further comprising generating the output symbols based on the probabilities.

11. A fixed-lag processing device that generates output information symbols based on T number of input information symbols that extend through T number of time periods and a plurality of matrices, each one of the time periods corresponding to one of the input symbols and one of the plurality of matrices, the device comprising:
a memory device;
a matrix multiplier; and
a controller coupled to the memory and the matrix multiplier, the controller generating intermediate results, where each of the intermediate results is generated by storing in the memory a first number of the matrices and a second number of matrix products, the first number being equal to $\tau+1$ where $\tau$ is a memory length and a $\tau$ is less than T, and the second number being less than $\tau-1$, selecting an optimum intermediate result of the intermediate results, and outputting probabilities of the output symbols based on the optimum intermediate result.

12. The device of claim 11, the controller generates a first term of each of the intermediate results based on a first matrix of the first number of matrices and generates a second term of each of the intermediate results based on a first product of the second number of matrix products, the controller directing the matrix multiplier to matrix multiplying the first term and the second term to generate each of the intermediate results.

13. The device of claim 11, wherein the first number of matrices is ordered in a time sequence, the first matrix of the first number of matrices corresponds to an earliest time period of the first number of matrices, the controller generating a next first number of matrices by shifting the sequence of the first number of matrices by one for each of the time periods so that a second matrix becomes the first matrix and a third matrix becomes the second matrix and so on until a new matrix becomes a last matrix of the first number of matrices.

14. The device of claim 13, further comprising a matrix inverter, wherein the second number is equal to one and the first product is the only product of the second number of matrix products, the controller directing the matrix inverter to matrix invert the first matrix of the next first number of matrices to generate an inverted matrix and the matrix multiplier to matrix multiply the inverted matrix, the first product, and the new matrix to generate a next first product.

15. The device of claim 13, wherein the first number of matrices is stored in a FIFO of the memory, each location of the FIFO storing one of the matrices, the new matrix is stored as an input to the FIFO and an next output of the FIFO being the first matrix.

16. The device of claim 13, wherein the second number of matrix products is ordered in the time sequence, the first product of the second number of matrix products corresponds to an earliest time period of the second number of matrix products, the controller generating a next second number of matrix products by:
directing the matrix multiplier to generate first results by matrix multiplying each of a second product through a last product by the new matrix and replacing each of the first product through a next to last product, respectively, with the first results of the matrix multiplication; and
directing the matrix multiplier to generate second results by matrix multiplying the last matrix of the first number of matrices with the new matrix and replacing a last product with the second results.

17. The device of claim 16, wherein the second number of matrix products is stored in contiguous order from the first product to the last product in a memory space of the memory having a pointer pointing to the first product in the memory space, each location of the memory space storing one of the second number of matrix products, contents of each location of the memory space being replaced by the contents matrix multiplied by the new matrix, the first product being replaced by a product of the new matrix, and the last matrix of the first number of matrices to generate the next second number of matrix products.

18. The device of claim 11, wherein the input symbols are at least one of symbols received over a communication channel, handwriting symbols in handwriting recognition, voice print features in voice recognition, and bioelectrical signals grouped in to symbol units.

19. The device of claim 18, wherein the plurality of matrices model processes including communication over channels, handwriting recognition, voice recognition and bioelectrical signal recognition, the matrices being generated based on modeling techniques including Hidden Markov Models.

20. The device of claim 11, wherein the controller generates the output symbols based on the probabilities.

* * * * *